UNITED STATES PATENT OFFICE.

CHARLES M. PORTER, OF WEST POINT, MISSISSIPPI.

INSECTICIDE.

SPECIFICATION forming part of Letters Patent No. 619,612, dated February 14, 1899.

Application filed November 2, 1898. Serial No. 695,331. (No specimens.)

*To all whom it may concern:*

Be it known that I, CHARLES M. PORTER, a citizen of the United States, residing in West Point, county of Clay, State of Mississippi, have invented a new and useful composition of matter for the purpose of destroying the peach and apple borer, bark-lice, and many other insects found on the trunk and root of the apple, peach, plum, cherry, apricot, and pear trees, (it is also intended to remove the rough exterior and put in perfect condition the main body of the tree,) of which the following is a specification.

My composition consists of the following ingredients, combined in the proportions stated, viz: water substantially pure, one-half gallon; unslaked lime, two pounds; soft lye-soap, (home made,) one quart; aqua ammonia, one-half pint; spirits of turpentine, one pint; sulfate of iron, one-half pound. These ingredients are to be thoroughly mixed by agitation.

In using the above-named composition the earth should be removed to the depth of three inches, and from the limbs down the loose bark and other loose substance should be removed. A brush or mop should be used in applying the liquid, which should be put on all the large parts of the lower limbs and all of the main body or trunk of the tree.

What I claim, and desire to secure by Letters Patent of the United States, is—

1. The herein-described composition of matter consisting of water, unslaked lime, soft home-made lye-soap, turpentine, aqua-ammonia, sulfate of iron substantially as described and for the purpose specified.

2. The herein-described composition of matter for destroying insects and toning up the tree, consisting of pure water, one-half gallon; unslaked lime, two pounds; one quart of soft home-made lye-soap; aqua-ammonia, one-half pint; turpentine, one pint; sulfate of iron, one-half pound, substantially as described.

C. M. PORTER.

Witnesses:
 J. A. DILWORTH,
 J. M. BOONE.